(12) United States Patent　(10) Patent No.: US 8,371,619 B2
Boonstra　(45) Date of Patent: Feb. 12, 2013

(54) QUICK CONNECTION DUCT SYSTEM

(76) Inventor: Terrence Edward Boonstra, Fulton, IL (US)

( * ) Notice: Subject to any disclaimer, the term of this patent is extended or adjusted under 35 U.S.C. 154(b) by 32 days.

(21) Appl. No.: 13/042,335

(22) Filed: Mar. 7, 2011

(65) Prior Publication Data

US 2011/0215572 A1　Sep. 8, 2011

Related U.S. Application Data

(60) Provisional application No. 61/311,066, filed on Mar. 5, 2010.

(51) Int. Cl.
*F16L 37/00*　(2006.01)

(52) U.S. Cl. .......................................... 285/305; 285/424
(58) Field of Classification Search ................... 285/305, 285/424, 183, 330, 921
See application file for complete search history.

(56) References Cited

U.S. PATENT DOCUMENTS

| | | | | |
|---|---|---|---|---|
| 4,819,972 A * | 4/1989 | Champa et al. | ................ | 285/331 |
| 5,195,789 A * | 3/1993 | Walsh et al. | ................ | 285/331 |
| 7,018,127 B2 * | 3/2006 | Walsh et al. | ................ | 403/294 |

* cited by examiner

*Primary Examiner* — Aaron Dunwoody
(74) *Attorney, Agent, or Firm* — Sinorica, LLC

(57) ABSTRACT

A quick connection duct system with a unique connection mechanism for quick installation of hermetically sealed ducts.

4 Claims, 5 Drawing Sheets

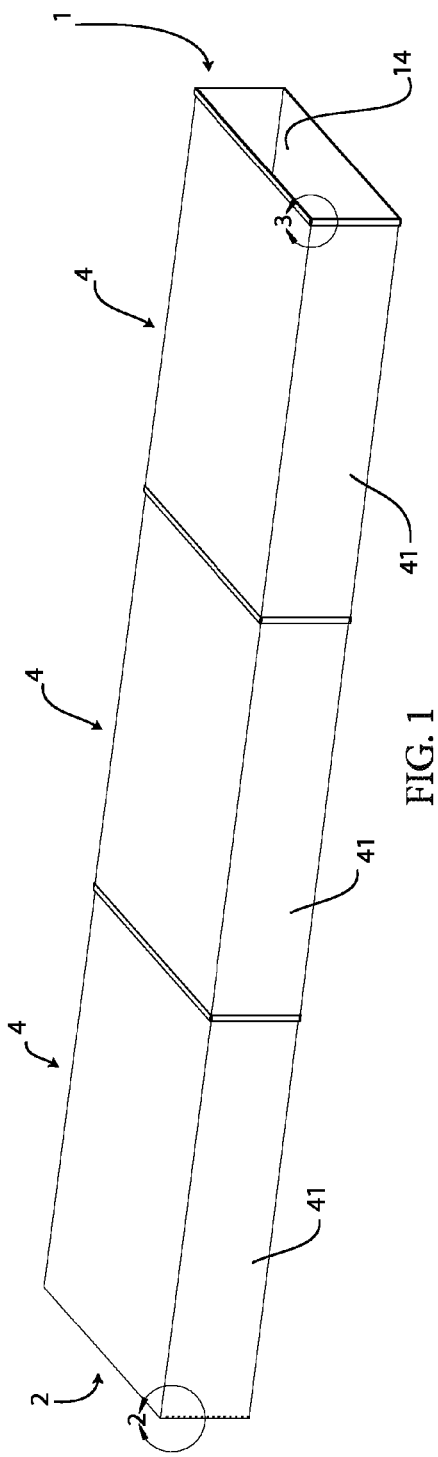
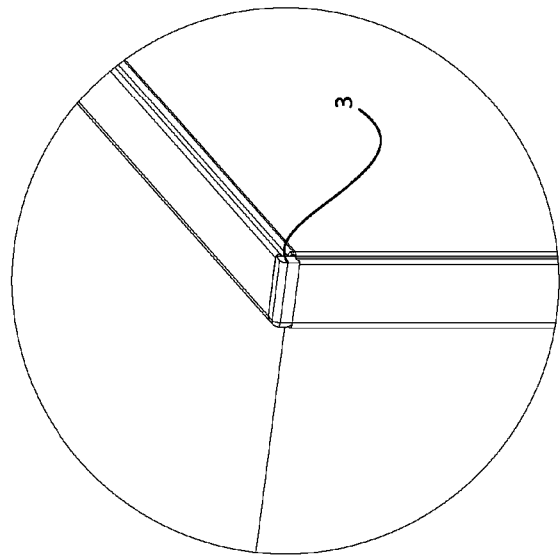
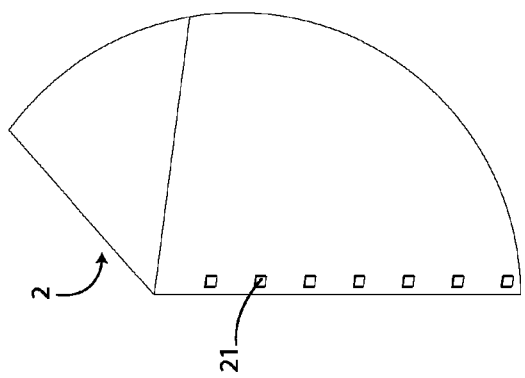

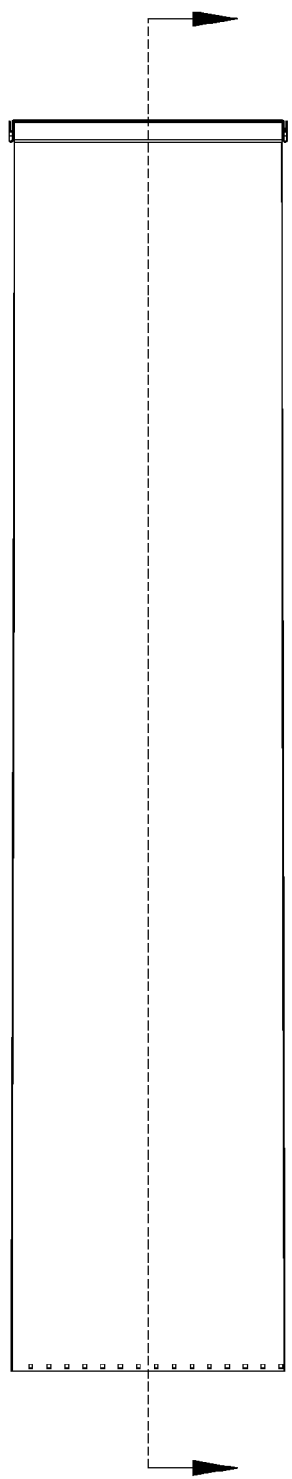
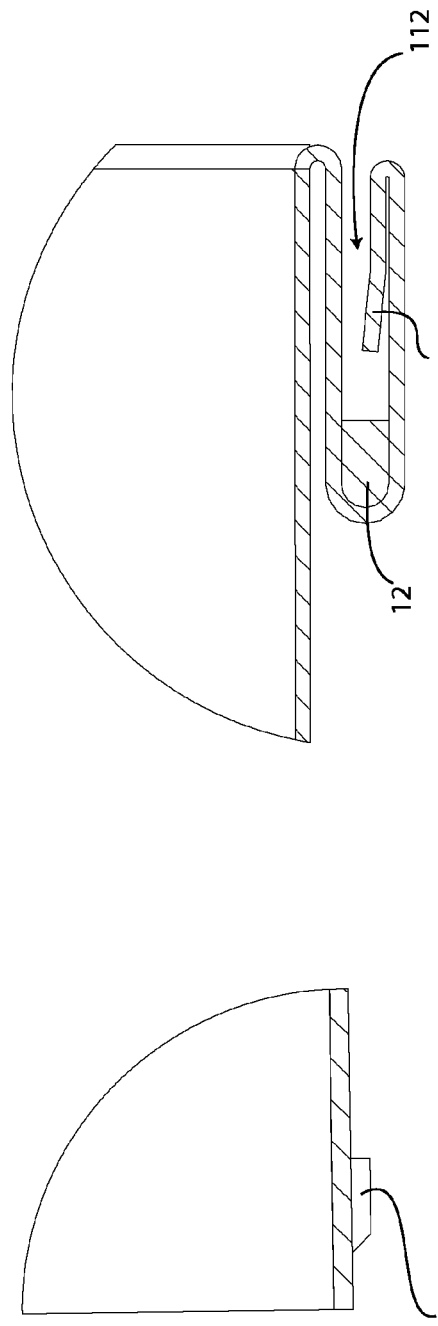

QUICK CONNECTION DUCT SYSTEM

The current application claims a priority to the U.S. Provisional Patent application Ser. No. 61/311,066 filed on Mar. 5, 2010.

FIELD OF THE INVENTION

The present invention relates generally to a quick connection duct system. More specifically, the present invention is a duct system that comprises of a unique connection mechanism for quick installation of hermetically sealed ducts.

BACKGROUND OF THE INVENTION

Air duct are channels that are constructed from segments of tubular structures to channel air to different areas of the interior space of a building. An air duct system is an important system that strongly affects the management of the environmental conditions of the interior of a building. Air ducts are typically segmented to provide versatility to the construction of the channeling system. The versatility of the air ducts allow constructors to channel the air ducts in any direction following the walls, floors, and ceilings of a building. Traditionally, air duct segments comprise of flanges on the ends for connection to other air duct segments. The flanges are aligned and fastened together by means of bolts and nuts. Due to all of the nuts and bolts that need to be aligned and fastened for each segment, using the traditional construction method for air ducts is very time consuming. Additionally, the traditional air ducts requires gaskets to be aligned and positioned in between air duct flanges to be sealed air tight. Over a long period of time, the connection of the bolt and nut can loosen causing leakage of air flow. Maintenance is often required for the traditional air duct system to ensure optimum air flow and even distribution of conditioned air throughout a building. Another ductwork design standard utilizes s-clips and drive cleats to connect duct segments together, and the drive cleats are also used as a temporary means of hanging the duct. Other means of hanging the duct will then be incorporated because hanging the duct with drive cleats is not safe. This design of ductwork has been around for years and is utilized by many metal fabricators and contractors. On bigger commercial applications ductwork would have to be installed by at least two installers. Sealing this duct utilizes many different means, some are more time consuming than others. A technique used widely in the industry is to apply mastic with a mesh scrim. Most of the time, this technique requires more than one coat of mastic with drying time in between coats. The present invention would only require an installer to seal four corners and be completed with that joint. Timesavers are moneymakers in this industry. With traditional ductwork, the s-cleats and drive cleat are separate from the ducts. If a user gets shorted or loses any of these parts, the duct is unable to be constructed. The present invention roll forms the s-cleat right onto the ductwork so there are non separate pieces that can get lost. The present invention overcomes the short comings of the traditional air duct system by proving a uniquely designed new air duct system. The present invention is an air duct system that provides the users with the ability to quickly assemble air duct segments while providing hermetic seal between each segment.

BRIEF DESCRIPTION OF THE DRAWINGS

FIG. 1 is a perspective view of the present invention showing the plurality of duct segments being connected in series. Detailed views of the plurality of locking notches and the clip edge are taken and shown in FIG. 2 and FIG. 3.

FIG. 2 is a view of the plurality of locking notches positioned on the inserting duct end;

FIG. 3 is a view of the clip edge positioned on the receiving duct end of the present invention. The clip edge is shown with the fill sealant applied.

FIG. 6 is a side elevational view of a duct segment of the present invention in which detailed cross sectional views are taken and shown in FIG. 7 and FIG. 8.

FIG. 7 is a detailed cross sectional view of the locking notch positioned adjacent to the connecting duct opening.

FIG. 8 is a detailed cross sectional view of the clip edge positioned on the receiving duct end.

DETAIL DESCRIPTIONS OF THE INVENTION

Figure 4:
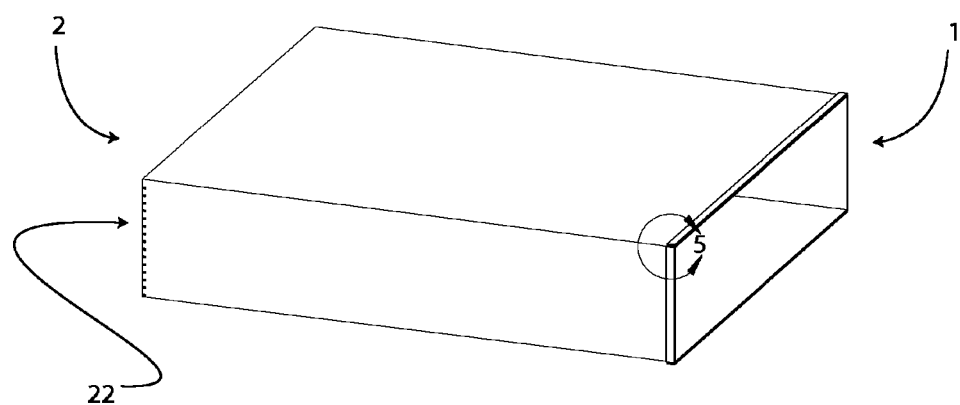
FIG. 4 is a perspective view of a single duct segment in which a detailed view of the clip edge is taken and shown in FIG. 5.
Figure 5:
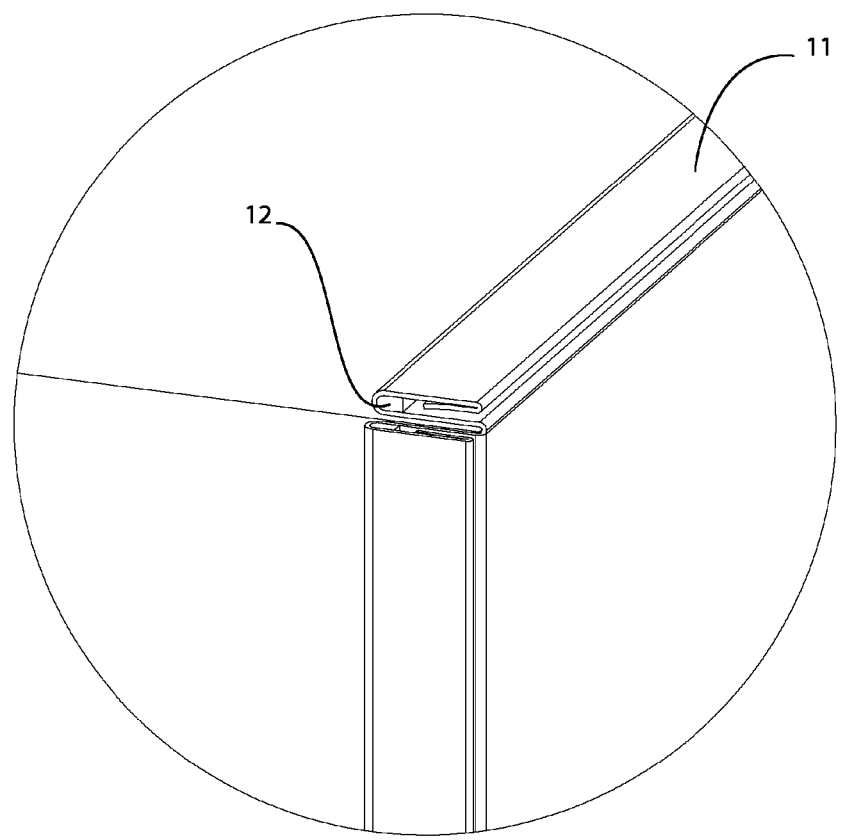
FIG. 5 is a view of the clip edge without the fill sealant applied.
Figure 9:
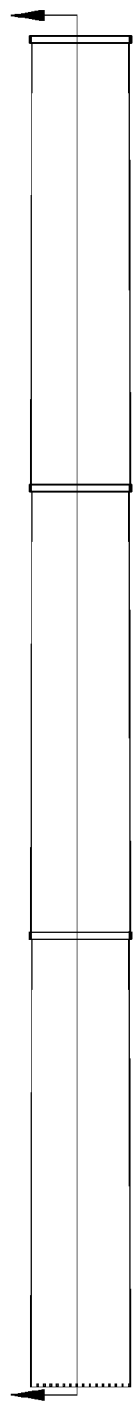
FIG. 9 is a side elevational view of the plurality of duct segments being connected in series in which a detailed sectional view is taken and shown in FIG. 10.

All illustrations of the drawings are for the purpose of describing selected versions of the present invention and are not intended to limit the scope of the present invention.

The present invention is a duct system that comprises a plurality of duct segments 4, and a fill sealant 3. The plurality of duct segments 4 are structures with hollow channels 5 that are able to direct fluid flow. The plurality of duct segments 4 has a receiving duct end 1 and an inserting duct end 2. The plurality of duct segments 4 is connected together by means of the receiving duct end 1 and an inserting duct end 2 to provide the channeling of the air duct system. In reference to FIG. 1, FIG. 4, FIG. 6, and FIG. 9, the receiving duct end 1 has a receiving channel opening 14. The inserting duct end 2 has a connecting duct opening 22. The receiving channel opening 14 and the connecting duct opening 22 are both openings leading into the hollow channel 5 provided by the plurality of duct segments 4. With the connection of the receiving duct end 1 to the inserting duct end 2, the receiving channel opening 14 and the connecting duct opening 22 are also connected. The connection of the receiving channel opening 14 and the connecting duct opening 22 result in the connection of the hollow channels 5 for each hollow channel 5 of each duct segment 4 for an elongated hollow channel 5.

In reference to FIG. 2 and FIG. 7, the inserting duct end 2 comprises of a plurality of locking notches 21. In the preferred embodiment of the present invention, the plurality of duct segments 4 has a rectangular shape. The rectangular shape of the duct segment 4 provides the plurality of duct segments 4 with sides 41. The plurality of locking notches 21 is angled and protrudes from the sides of the duct segment 4 adjacent to the connecting duct opening 22. All of the locking notches 21 are arranged in a linear fashion in parallel relationship to the edge of the connecting duct opening 22. In other embodiments of the present invention, the shape of the plurality of duct segments 4 can also be circles, trapezoids, or hexagons. However, the locking notches 21 will always be arranged in a linear and parallel fashion to the connecting duct opening 22.

In reference to FIG. 3 and FIG. 8, the receiving duct end 1 comprises of a clip edge 11, a clip seal 12, and a sealant bead 13. The clip edge 11 is an s-shaped clip 111 that is peripherally positioned and lined on the edge of the receiving duct end 1. The clip edge 11 is shaped to provide a receiving slot 112 that is able to receive the inserting duct end 2 of the present invention. Within the receiving slot 112 is positioned the clip seal 12.

The clip seal 12 is a lining arranged throughout the length of the clip edge 11 on all the sides of the receiving duct end 1. The clip seal 12 lines the clip edge 11 to provide the present invention the ability to be hermetically sealed. The sealant beads 13 is positioned and connected to the clip edge 11 within the receiving slot 112 facing inwardly towards the hollow channel 5. The sealant bead 13 is the portion of the clip edge 11 that is able to secure the connection of the duct segments 4 together. The sealant bead 13 is a continued portion of the clip edge 11 that rolls back into the clip edge 11 and inwardly. The sealant bead 13 is shaped to have lateral stability and vertical flexibility. The lateral stability provides the sealant bead 13 the ability to securely hold duct segments 4 together. The vertical flexibility provides the sealant bead 13 the ability to easily accept the connection of other duct segments 4.

Figure 10:
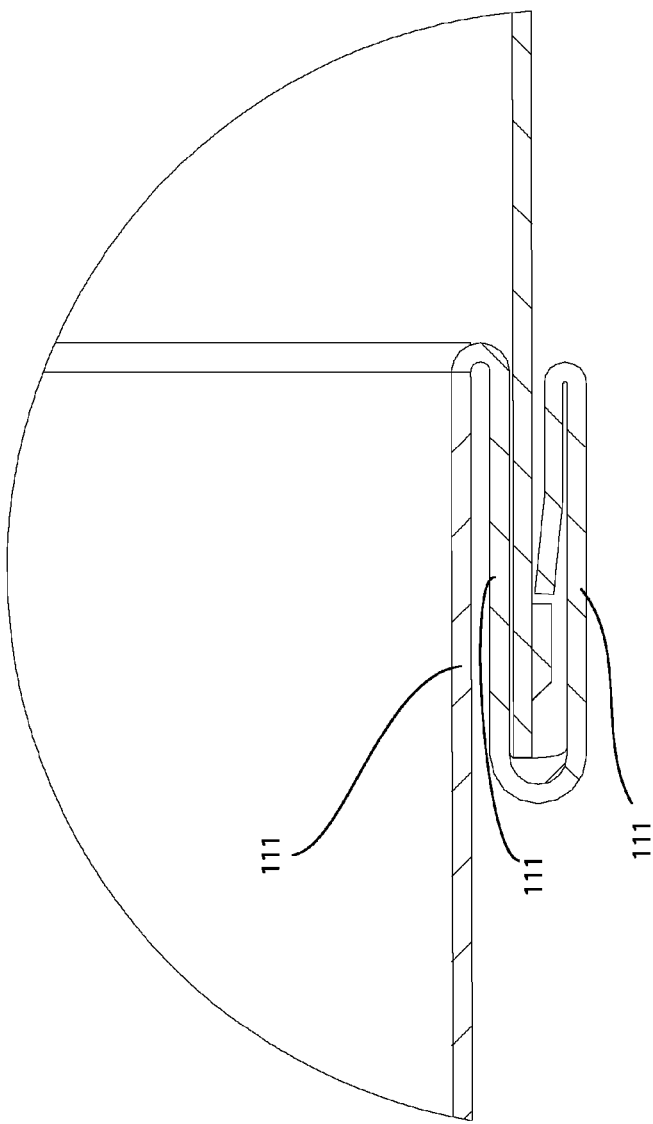
FIG. 10 is a detailed cross sectional view of the connection of the receiving duct end and the inserting duct end.
Figure 11:
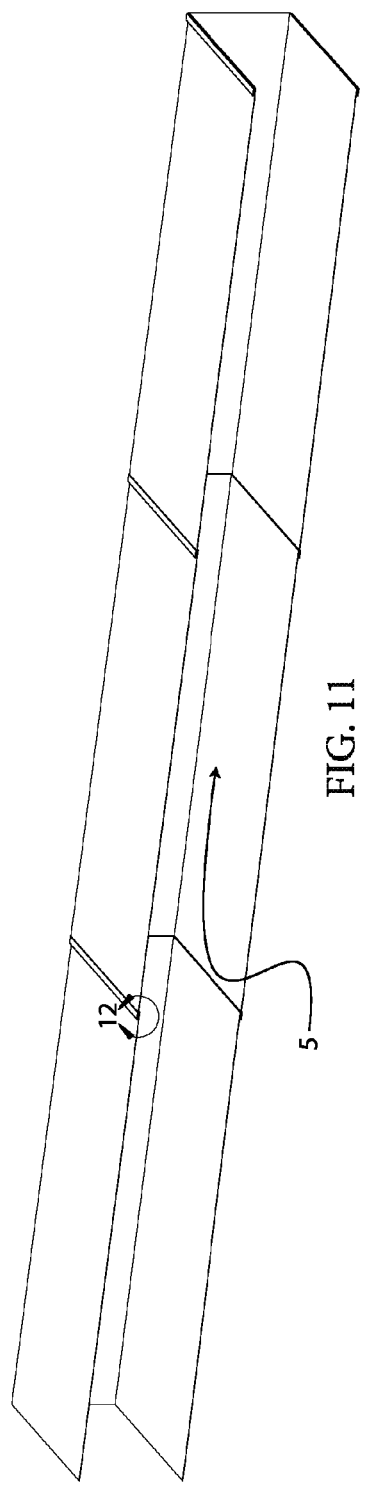
FIG. 11 is a perspective view of the plurality of duct segments being connected in series in which a detailed view of two connected duct segments is taken and shown in FIG. 12.
Figure 12:
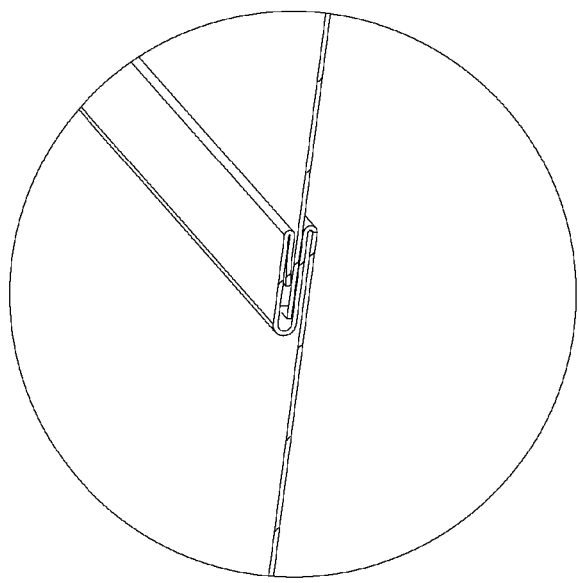
FIG. 12 is a detailed perspective view of the connection of the receiving duct end and the inserting duct end.

In reference to FIG. 10, the connection of the duct segments 4 involves the insertion of the inserting duct end 2 into the receiving slot 112 of the clip edge 11. When the inserting duct end 2 is inserted into the receiving slot 112 of the clip edge 11, the plurality of locking notches 21 engages the sealant beads 13 of the clip edge 11. The plurality of locking notches 21 is able to be inserted into the receiving slot 112 due to the vertical flexibility of the sealant beads 13. The insertion of the inserting duct end 2 into the receiving slot 112 depresses and deforms the sealant bead 13 for full engagement. The engagement of the plurality of locking notches 21 to the sealant beads 13 secures the inserting duct end 2 to the receiving duct end 1. The lateral stability of the sealant bead 13 prevents the plurality of locking notches 21 from easily disengaging. The clip seal 12 is compressed by the inserting duct end 2 when it is inserted into the receiving end 1. The slight compression of the clip seal 12 provides a tight contact and hermetic seal between the inserting duct end 2 and the receiving duct end 1. The clip seal 12 can be made from sealant materials selected from the group consisting of rubber, silicone, or any other suitable sealing materials. Once the inserting duct end 2 is connected to the receiving duct end 1, it becomes difficult to disassemble the two components without deforming the clip edge 11. To further hermetically seal the connection of the inserting duct end 2 and the receiving duct end 1, a fill sealant 3 is filled into the voids between the clip edge 11 and the inserting duct end 2. The hermetically sealed channels provide the air duct system with the ability to channel conditioned air flow evenly throughout the interior space of a building. The present invention also provides users with the ease of assembly by allowing them to simply insert duct segment into one another and apply the fill sealants.

Although the invention has been explained in relation to its preferred embodiment, it is to be understood that many other possible modifications and variations can be made without departing from the spirit and scope of the invention as hereinafter claimed.

What is claimed is:
1. A quick connection duct system comprises,
a plurality of duct segments;
a fill sealant;
each of the plurality of duct segments having a receiving duct end and an inserting duct end, wherein each duct segment has a hollow channel able to direct fluid flow;
the receiving duct end comprises a clip edge, a clip seal, sealant beads, a receiving channel opening;
the inserting duct end comprises a plurality of locking notches and a connecting duct opening; and
the plurality of duct segments being interconnected by means of the connection of the receiving duct end with the inserting duct end;
the clip edge being an s-shaped clip peripherally positioned and connected about the receiving duct end;
the clip edge having a receiving slot;
the clip seal being positioned in receiving slot; and
the sealant beads being positioned on the clip edge within the receiving slot facing inwardly towards the hollow channel;
the plurality of duct segments having side surfaces;
the plurality of locking notches being positioned on the side surface of the plurality of duct segments adjacently to the connecting duct opening; and
the plurality of locking notches being arranged in linear fashion in parallel relation to the connecting duct opening;
the inserting duct end being inserted into the receiving slot of the clip edge;
the plurality of locking notches engaging the sealant beads of the clip edge, wherein the engagement of the plurality of locking notches to the sealant beads secures the inserting duct end to the receiving duct end; and
the clip seal being compressed by the insertion of the inserting duct end, wherein the clip seal being in direct contact with the inserting duct end hermetically seals the connection of the inserting duct end with the receiving duct end.

2. The quick connection duct system as claimed in claim 1 comprises,
the connecting duct opening and the receiving channel openings leading into the hollow channel;
wherein the connection of the receiving duct end with the inserting duct end also connects the receiving channel opening and the connecting duct opening; and
wherein the connection of the receiving channel opening and the connecting duct opening connects the hollow channels of the plurality of duct segments for a elongated hollow channel.

3. The quick connection duct system as claimed in claim 1 comprises,
the fill sealant being filled between the clip edge and the inserting duct end for a stronger hermetic seal.

4. A quick connection duct system comprises,
a plurality of duct segments;
a fill sealant;
each of the plurality of duct segments having a receiving duct end and an inserting duct end, wherein each duct segment has a hollow channel able to direct fluid flow;
the receiving duct end comprises a clip edge, a clip seal, sealant beads, a receiving channel opening;
the inserting duct end comprises a plurality of locking notches and a connecting duct opening;
the plurality of duct segments being interconnected by means of the connection of the receiving duct end with the inserting duct end;

the clip edge being an s-shaped clip peripherally positioned and connected about the receiving duct end;

the clip edge having a receiving slot;

the clip seal being positioned in receiving slot;

the sealant beads being positioned on the clip edge within the receiving slot facing inwardly towards the hollow channel;

the inserting duct end being inserted into the receiving slot of the clip edge;

the plurality of duct segments having side surfaces;

the plurality of locking notches being positioned on the side surface of the plurality of duct segments adjacently to the connecting duct opening; the plurality of locking notches being arranged in linear fashion in parallel relation to the connecting duct opening;

the connecting duct opening and the receiving channel openings leading into the hollow channel;

wherein the connection of the receiving duct end with the inserting duct end also connects the receiving channel opening and the connecting duct opening;

wherein the connection of the receiving channel opening and the connecting duct opening connects the hollow channels of the plurality of duct segments for a elongated hollow channel;

the plurality of locking notches engaging the sealant beads of the clip edge, wherein the engagement of the plurality of locking notches to the sealant beads secures the inserting duct end to the receiving duct end;

the clip seal being compressed by the insertion of the inserting duct end, wherein the clip seal being in direct contact with the inserting duct end hermetically seals the connection of the inserting duct end with the receiving duct end; and the fill sealant being filled between the clip edge and the inserting duct end for a stronger hermetic seal.

\* \* \* \* \*